(12) United States Patent
Hamachi

(10) Patent No.: US 9,826,384 B2
(45) Date of Patent: Nov. 21, 2017

(54) COMMUNICATION APPARATUS, METHOD FOR CONTROLLING THE SAME, AND PROGRAM

(71) Applicant: CANON KABUSHIKI KAISHA, Tokyo (JP)

(72) Inventor: Toshifumi Hamachi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 117 days.

(21) Appl. No.: 14/762,528

(22) PCT Filed: Jan. 18, 2014

(86) PCT No.: PCT/JP2014/000234
§ 371 (c)(1),
(2) Date: Jul. 22, 2015

(87) PCT Pub. No.: WO2014/115525
PCT Pub. Date: Jul. 31, 2014

(65) Prior Publication Data
US 2015/0373524 A1 Dec. 24, 2015

(30) Foreign Application Priority Data
Jan. 25, 2013 (JP) ................. 2013-012138

(51) Int. Cl.
*H04W 8/00* (2009.01)
*G06F 3/12* (2006.01)
*H04W 84/12* (2009.01)

(52) U.S. Cl.
CPC .......... *H04W 8/005* (2013.01); *G06F 3/1226* (2013.01); *G06F 3/1236* (2013.01); *G06F 3/1286* (2013.01); *G06F 3/1293* (2013.01); *G06F 3/1296* (2013.01); *H04W 84/12* (2013.01)

(58) Field of Classification Search
CPC ...... H04W 8/005; H04W 84/12; H04W 4/008
See application file for complete search history.

(56) References Cited

U.S. PATENT DOCUMENTS

| 2008/0072220 A1* | 3/2008 | Saffre ............... G06F 9/5055 717/177 |
| 2011/0235600 A1* | 9/2011 | Sun ................. H04W 72/1215 370/329 |
| 2013/0254878 A1* | 9/2013 | Clarke ............... G06F 15/16 726/22 |

FOREIGN PATENT DOCUMENTS

| EP | 2293517 A1 | 3/2011 |
| EP | 2487963 A2 | 8/2012 |
| JP | 2001-256022 A | 9/2001 |
| JP | 2004-252518 A | 9/2004 |
| JP | 2004-328272 A | 11/2004 |

(Continued)

*Primary Examiner* — Jamal Javaid
(74) *Attorney, Agent, or Firm* — Canon U.S.A., Inc. IP Division

(57) ABSTRACT

Another apparatus is prevented from being notified of a service which cannot be used, in spite of the service that cannot be used. A communication apparatus includes a receiving unit, a detection unit, and a controller. The receiving unit receives a search signal from a second communication apparatus. The detection unit detects an execution state of a predetermined service. The controller transmits no response signals to the search signal or transmits a signal indicating that it is impossible to provide a service in response to the search signal when the predetermined service is being executed.

14 Claims, 7 Drawing Sheets

(56) References Cited

FOREIGN PATENT DOCUMENTS

| | | | |
|---|---|---|---|
| JP | 2006-173678 | A | 6/2006 |
| JP | 2007-87046 | A | 4/2007 |
| JP | 2009-213115 | A | 9/2009 |
| JP | 2011-35768 | A | 2/2011 |
| WO | 2008-093817 | A1 | 8/2008 |
| WO | 2011-010909 | A1 | 1/2011 |
| WO | 2011/163088 | A1 | 12/2011 |

* cited by examiner

COMMUNICATION APPARATUS, METHOD FOR CONTROLLING THE SAME, AND PROGRAM

CROSS REFERENCE TO RELATED APPLICATIONS

This application is a National Stage filing of International Application No. PCT/JP2014/000234 filed Jan. 18, 2014, which claims the benefit of priority from Japanese Patent Application No. 2013-012138 filed Jan. 25, 2013, the disclosures of each of which are hereby incorporated by reference herein in their entirety.

TECHNICAL FIELD

The present invention relates to a communication apparatus, a method for controlling the communication apparatus, and a program.

BACKGROUND ART

Recently, there have been an increasing number of cases in which a wireless local-area network (LAN) station function is installed in an electronic device, such as a digital camera or a printer, and in which the electronic device is used as a communication apparatus in such a manner as to be connected to a wireless LAN. For example, in PTL 1, a method is disclosed in which a wireless LAN function is installed in a digital camera in order to facilitate image sharing.

Wi-Fi Alliance has defined a standard called Wi-Fi Direct (trademark). In Wi-Fi Direct, a protocol is defined which is used to determine whether each of electronic devices is to operate as a wireless LAN access point or as a wireless LAN station. Execution of the protocol allows automatic determination as to which electronic device is to be a wireless LAN access point and which electronic device is to be a wireless LAN station.

In Wi-Fi Direct, a function (service discovery function) of advertising and searching for service information supported by a higher-layer application is also defined as an option function. The service discovery function allows service information stored in an electronic device that is to be a connection target, to be identified before connection is established.

When a service is being executed, resource conflicts and deficiency in performance may cause the operation of another service to be limited.

However, even in a case where a service cannot be used, other apparatuses may be notified of the service which cannot be used. In addition, a service operation being limited cannot be detected until the service is executed.

CITATION LIST

Patent Literature

PTL 1: Japanese Patent Laid-Open No. 2011-35768

SUMMARY OF INVENTION

Solution to Problem

The present invention intends to improve convenience of use of a service. For example, other apparatuses are prevented from being notified of a limited service in spite of the service operation being limited. Other intentions of the present invention will be clear from the description below and the drawings.

According to a first aspect of the present invention, there is provided a communication apparatus including a receiving unit, a detection unit, and a controller. The receiving unit receives a search signal from a second communication apparatus. The detection unit detects an execution state of a predetermined service. The controller transmits no response signals to the search signal or transmits a signal indicating that it is impossible to provide a service in response to the search signal when the predetermined service is being executed.

According to a second aspect of the present invention, there is provided a communication apparatus including a discovery unit, a detection unit, and a controller. The discovery unit performs discovery including at least one of searching for a service provided by a second communication apparatus, advertising information indicating a service provided by the communication apparatus, and responding to a service search from the second communication apparatus. The detection unit detects an execution state of a predetermined service. The controller does not cause the discovery unit to perform the discovery when the predetermined service is being executed.

Further features of the present invention will become apparent from the following description of exemplary embodiments with reference to the attached drawings.

DESCRIPTION OF EMBODIMENTS

First Embodiment

A communication apparatus according to a first embodiment will be described below in detail with reference to the drawings. An example using a wireless LAN system based on IEEE 802.11 series will be described below. However, the communication configuration is not necessarily limited to a wireless LAN based on IEEE 802.11.

The hardware configuration of a desirable example of the first embodiment will be described.

Figure 1:
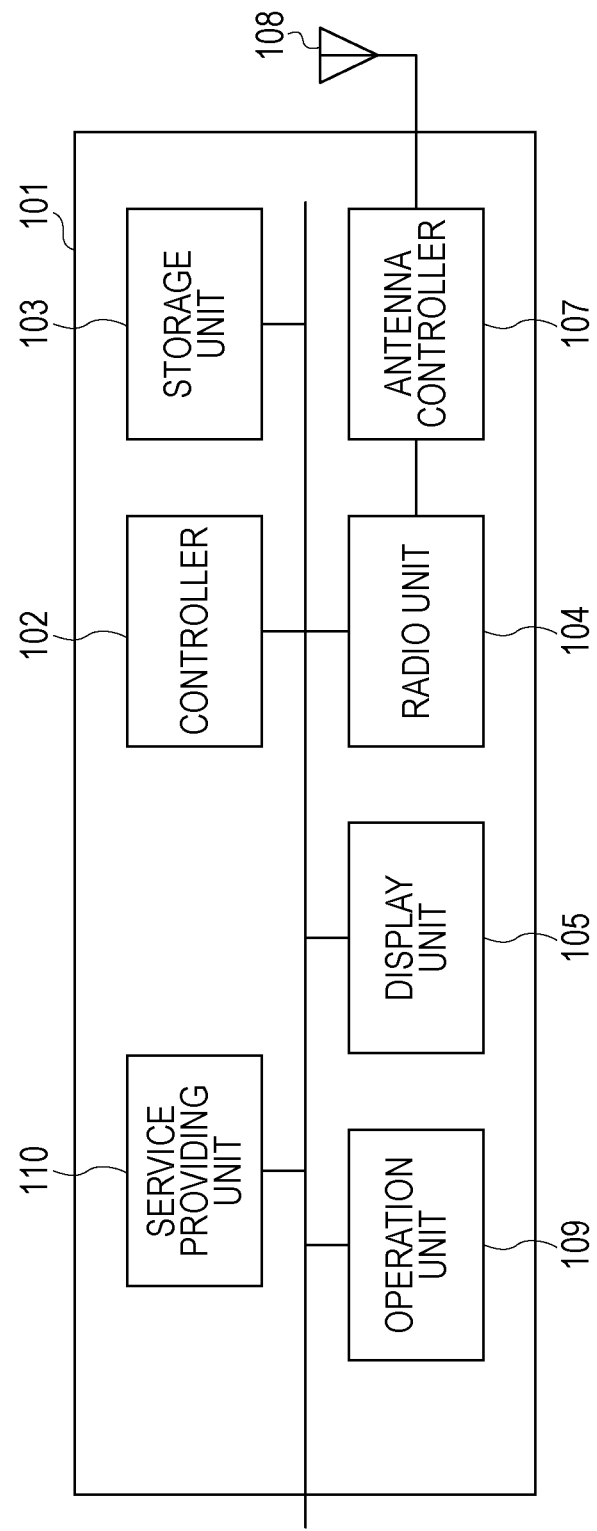
FIG. 1 is a block diagram illustrating the configuration of an apparatus.

FIG. 1 is a block diagram illustrating the configuration of apparatuses described below according to the first embodiment. An entire apparatus 101 is illustrated. A controller 102 controls the entire apparatus by executing control programs stored in a storage unit 103. The controller 102 controls setting of communication parameters between the apparatus and another apparatus. The storage unit 103 stores the control programs executed by the controller 102 and various types of information such as communication parameters.

Various operations described below are performed with the controller 102 executing the control programs stored in the storage unit 103.

A radio unit 104 performs wireless LAN communication based on IEEE 802.11 series. A display unit 105 performs various types of display, and has a function which allows output of visually recognizable information, for example, using a liquid crystal display (LCD) or a light-emitting diode (LED), or output of sound, for example, from a speaker. The display unit 105 has a function of outputting at least one of visual information and sound information. An antenna controller 107 and an antenna 108 are illustrated. An operation unit 109 is used by a user to input various types of information so as to operate the communication apparatus.

A service providing unit 110 has a function of providing information about a service at the application level which is offered by the communication apparatus. For example, in the case where the communication apparatus is a printer, the communication apparatus offers a print function. In the case where the communication apparatus is a digital camera, the communication apparatus offers a function of capturing an image. In the case where the communication apparatus is a display, the communication apparatus offers a display function.

Figure 2:
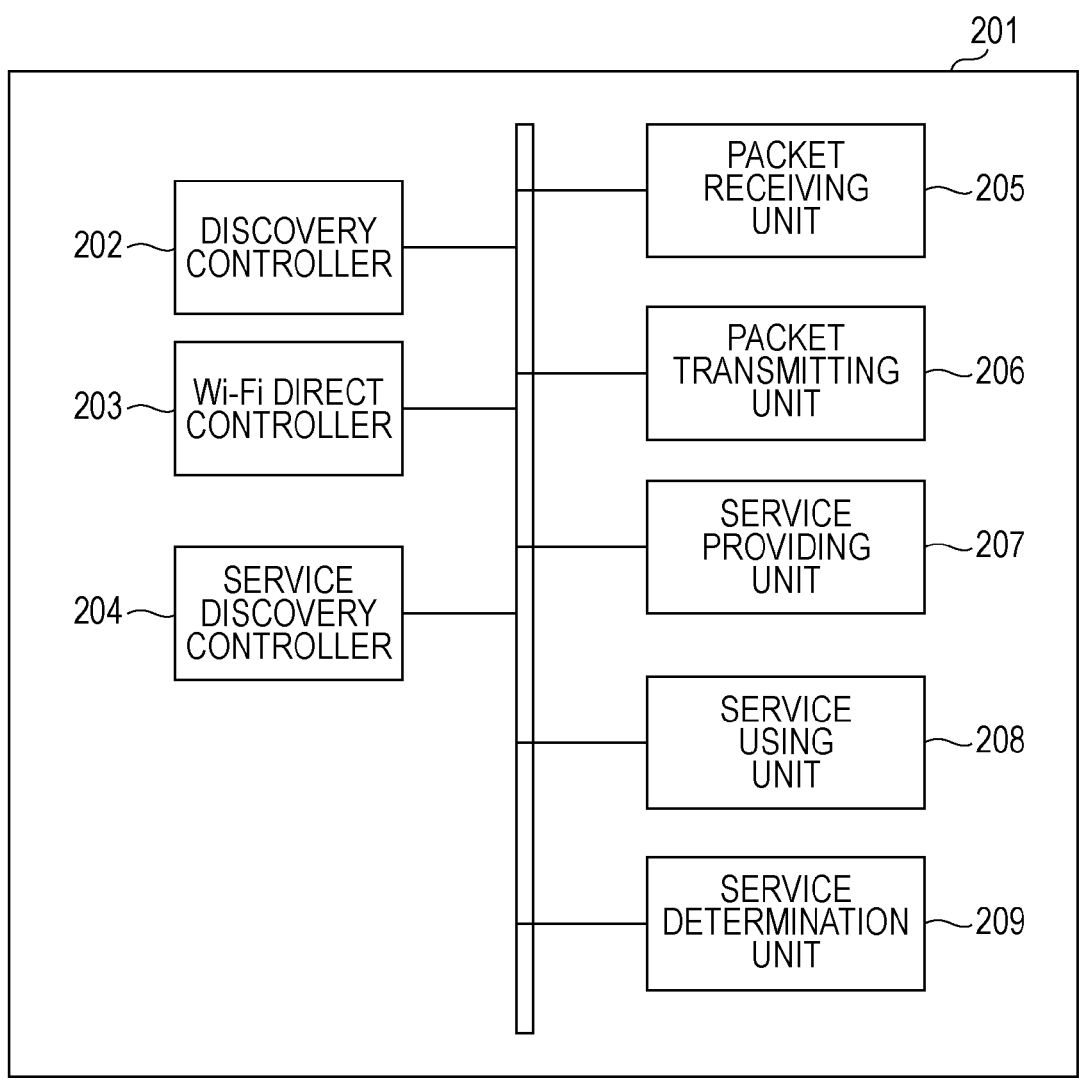
FIG. 2 is a software functional block diagram of an apparatus.

FIG. 2 is a block diagram illustrating an exemplary configuration of software functional blocks for executing a communication control function described below. An entire software functional block 201 is illustrated. A discovery controller 202 invokes a search process of searching for a communication apparatus which is to be a communication target.

A Wi-Fi Direct controller 203 exerts control based on the Wi-Fi Direct protocol specification. In Wi-Fi Direct, a communication apparatus which performs a wireless LAN access-point function is called a P2P group owner (hereinafter, referred to as a GO), and a communication apparatus which performs a wireless LAN station function is called a P2P client (hereinafter, referred to as a CL). These roles are determined by using a GO negotiation protocol, and are defined in the Wi-Fi Direct specification. In Wi-Fi Direct, a network built by a GO serving as a base station is called a P2P group. Herein, a network may be referred to as a P2P group. These terms have the same meaning. A GO provides communication parameters for a CL, and establishes a connection by using the communication parameters. The communication parameters include various wireless communication parameters for performing wireless communication on the basis of the IEEE 802.11 standard. That is, the communication parameters include wireless communication parameters which need to perform wireless LAN communication, such as a service set identifier (SSID) as a network identifier, an encryption method, an encryption key, an authentication method, and an authentication key. In addition, the communication parameters also include an Internet Protocol (IP) address used in communication at the IP layer.

Herein, P2P group owners (GOs), P2P clients (CLs), and communication apparatuses whose roles have not been determined are collectively called P2P devices.

A service discovery controller 204 performs a service discovery function. The service discovery function allows transmission/reception of service information stored in a target communication apparatus by transmitting/receiving an action frame defined in IEEE 802.11u. Specifically, a service discovery (SD) query is transmitted, and an SD response is received as a response. Instead, an SD query is received from a target apparatus, and an SD response is transmitted as a response. The service discovery controller 204 searches for a service before or after wireless connection is established with a target apparatus detected by the discovery controller 202, under the control of the Wi-Fi Direct controller 203. A service search before wireless connection is established prevents establishment of wireless connection with a target apparatus that does not offer the target service. In the case where a service is searched for after wireless connection is established, a protocol defined at a layer higher than the radio layer (i.e., the network layer, the session layer, or the application layer) is used to search for a service. A service search at a layer higher than the radio layer allows a detailed service search to be performed.

A packet receiving unit 205 and a packet transmitting unit 206 receives/transmits all packets including a communication protocol at a higher layer.

A service providing unit 207 operates at the application layer. The application layer here is a service providing layer among the fifth and higher layers in the OSI reference model. That is, the service providing unit 207 provides, for example, a print function, an image streaming function, or a file transfer function. A service using unit (service receiving unit) 208 operates at the application layer. The service using unit 208 receives and uses a service offered by the service providing unit at the application layer in a target apparatus. That is, the service using unit 208 performs, for example, a function of transmitting a print document to a print service providing apparatus or a function of transmitting a movie to a digital display. A service determination unit 209 operates at the application layer. The service determination unit 209 determines whether or not an executing service is present, or whether or not a service is capable of operating simultaneously with (or in parallel with) an executing service.

All of the functional blocks have interrelationship in terms of software or hardware. The above-described functional blocks are exemplary. Multiple functional blocks may constitute a functional block, or any of the functional blocks may be divided into blocks which further perform functions.

Figure 3:
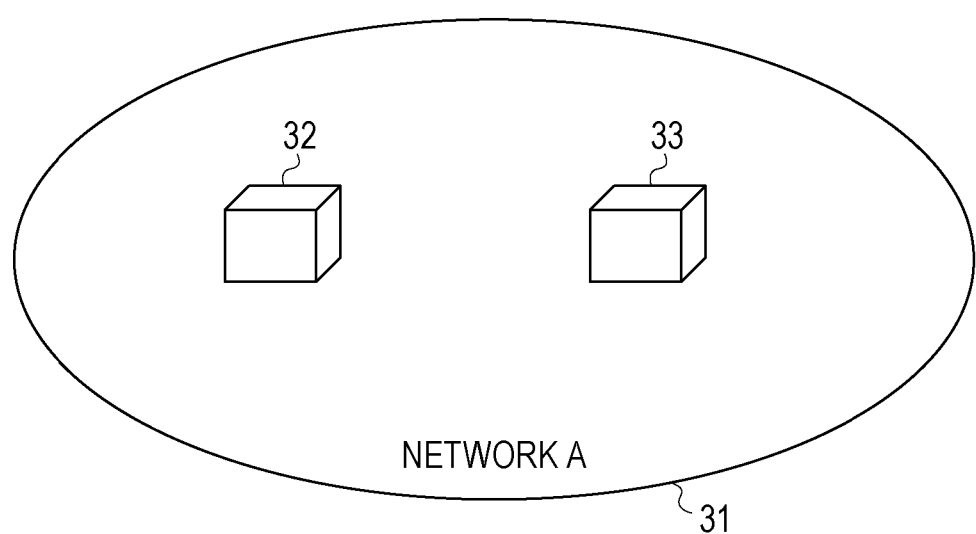
FIG. 3 is a diagram illustrating an exemplary network configuration to which the present invention is applied.

FIG. 3 is a diagram illustrating a network A 31 (hereinafter, referred to as a network A) including a communication apparatus A 32 (hereinafter, referred to as a STA-A) and a communication apparatus B 33 (hereinafter, referred to as a STA-B). Each of these apparatuses has the above-described configuration illustrated in FIGS. 1 and 2, and operates as a service providing apparatus or as a service using apparatus.

In the first embodiment, a case in which, in execution of a service, such as printing or video streaming, connection is established at the wireless LAN layer after the service is searched for in advance will be described.

Figure 4:
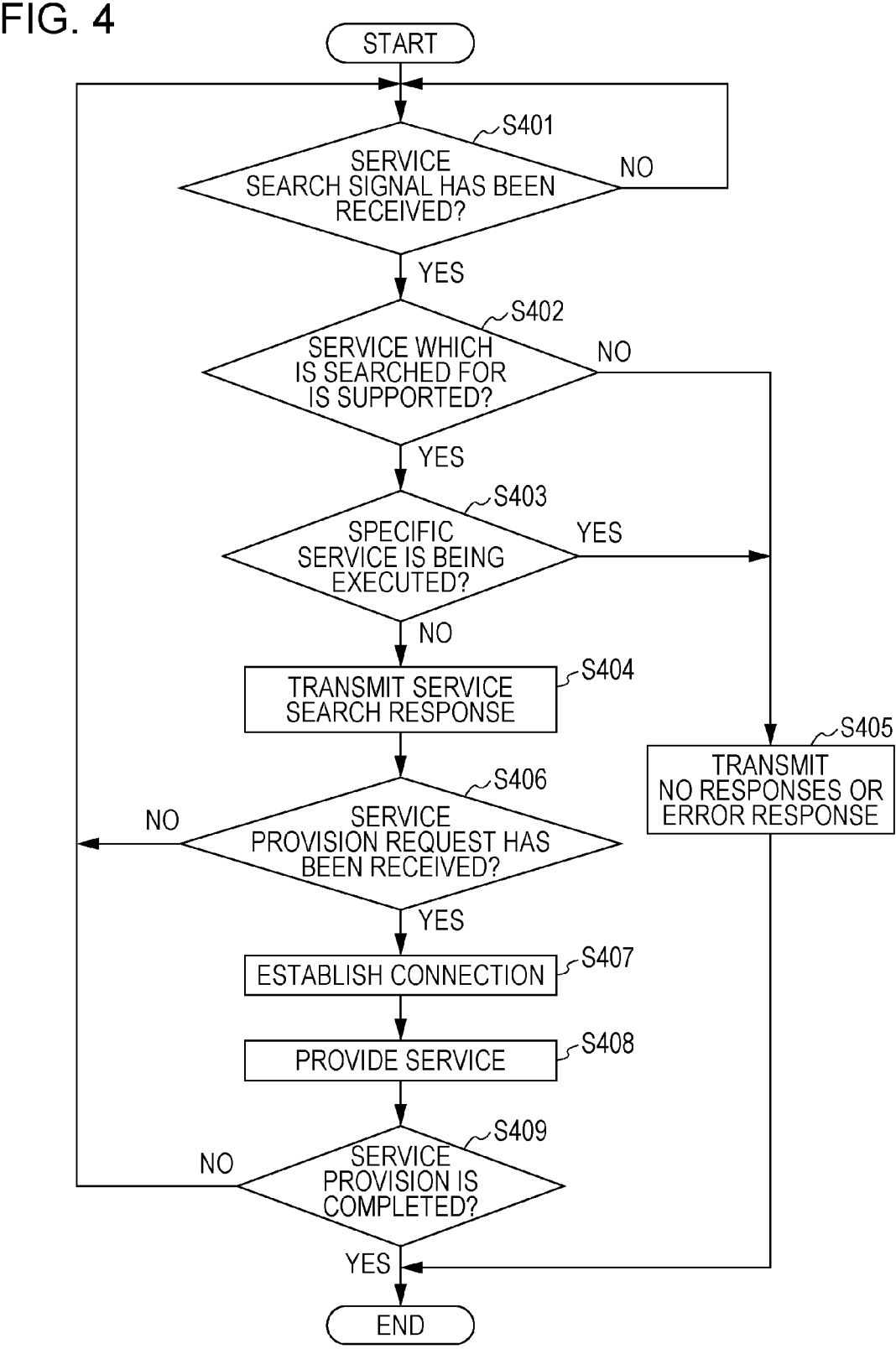
FIG. 4 is a flowchart of operations of an apparatus according to a first embodiment.

FIG. 4 is a flowchart of operations performed by a communication apparatus serving as a service providing apparatus. The operation flow of the communication apparatus performing a service search will be described by using the flowchart.

A service using apparatus (service receiving apparatus) searches for an apparatus which is to be a communication target, through a search performed by the discovery controller 202. The service using apparatus transmits a service search signal including information for specifying a service to be used (service, use of which is to be requested), to target apparatuses found in the search, and searches for a service providing apparatus which offers the service to be used. This search is performed through service discovery performed by the service discovery controller 204 of the service using apparatus.

The service providing apparatus uses the packet receiving unit 205 to wait for reception of a service search signal (S401). Upon reception of a service search signal, the service discovery controller 204 determines whether or not the service providing apparatus supports the service requested in the search signal (S402). If the service providing apparatus does not support the service, no responses to the search signal are transmitted, or an error response is transmitted (S405).

If the service providing apparatus supports the service requested in the search signal, the service determination unit 209 detects the execution state of a specific service, and determines whether or not the specific service is being executed (S403). The specific service is a predetermined service which is set as a service incapable of operating simultaneously with (or in parallel with) the service requested in the search signal. The specific service may be set in advance, or may be dynamically set from operations which were performed. Some apparatuses may have no services which are capable of operating simultaneously with (or in parallel with) the requested service. In this case, the service determination unit 209 may determine whether or not a service is already being executed. Whether or not a specific service is being executed may be determined by determining whether or not a service (providing or using process) which is incapable of operating simultaneously with (or in parallel with) the requested service is being executed.

If a specific service is not being executed, the service discovery controller 204 transmits a search response, and notifies the apparatus which has transmitted the search signal that the service providing apparatus can execute the service requested in the search signal (S404). If a specific service is being executed, no response signals to the search signal are transmitted, or an error response is returned (S405). After that, upon reception of a request signal indicating a request for service provision of the service for which the search response has been transmitted (S406), the Wi-Fi Direct controller 203 exerts control so that connection with the target apparatus is established (S407), and the service providing unit 207 provides the requested service (S408). Connection is established with the target apparatus as follows. On the basis of a predetermined protocol, one apparatus is set as the GO, and another apparatus is set as a CL. The GO supplies communication parameters to the CL. Then, wireless connection is established between the apparatuses. If the service provision is completed (S409), the process ends and returns back to the determination in S401.

The service providing apparatus waits for reception of a service search signal by using the packet receiving unit 205 even during provision of a service (S401). Upon reception of a service search signal, the service discovery controller 204 performs the above-described processes (from S402 to S409).

When no responses to the service search signal are returned in a predetermined time period, or when an error response is received, the service using apparatus searches for a different communication target apparatus through a search performed by the discovery controller 202. The service using apparatus transmits a service search signal including information indicating a service to be used (service, use of which is requested), to the target apparatus found in the search, and searches for a service providing apparatus which can offer the service to be used. When the service using apparatus receives a search response and determines that the service which has been searched for by using the search signal can be offered, the service using unit 208 requests service provision from the service providing apparatus and uses the service.

Examples of the service using side and the service providing side in the first embodiment are as follows. In the case of a print service, the using side is an apparatus storing images and documents to be printed, and the providing side is an apparatus having a print function. The former is a digital camera or a smart phone, and the latter is a printer. In the case of a video streaming service (movie streaming service), the using side is a video recording apparatus, such as a digital camera or a camcorder, and the providing side is an image display apparatus, such as a digital television (TV) or a projector.

If a service to be used is Digital Living Network Alliance (DLNA) (registered trademark), for example, the service using side is a digital media server (DMS), and the service providing side is a digital media renderer (DMR). The DLNA standard has various device classes, and one example is described here. For more detail, see the DLNA standard.

Figure 5:
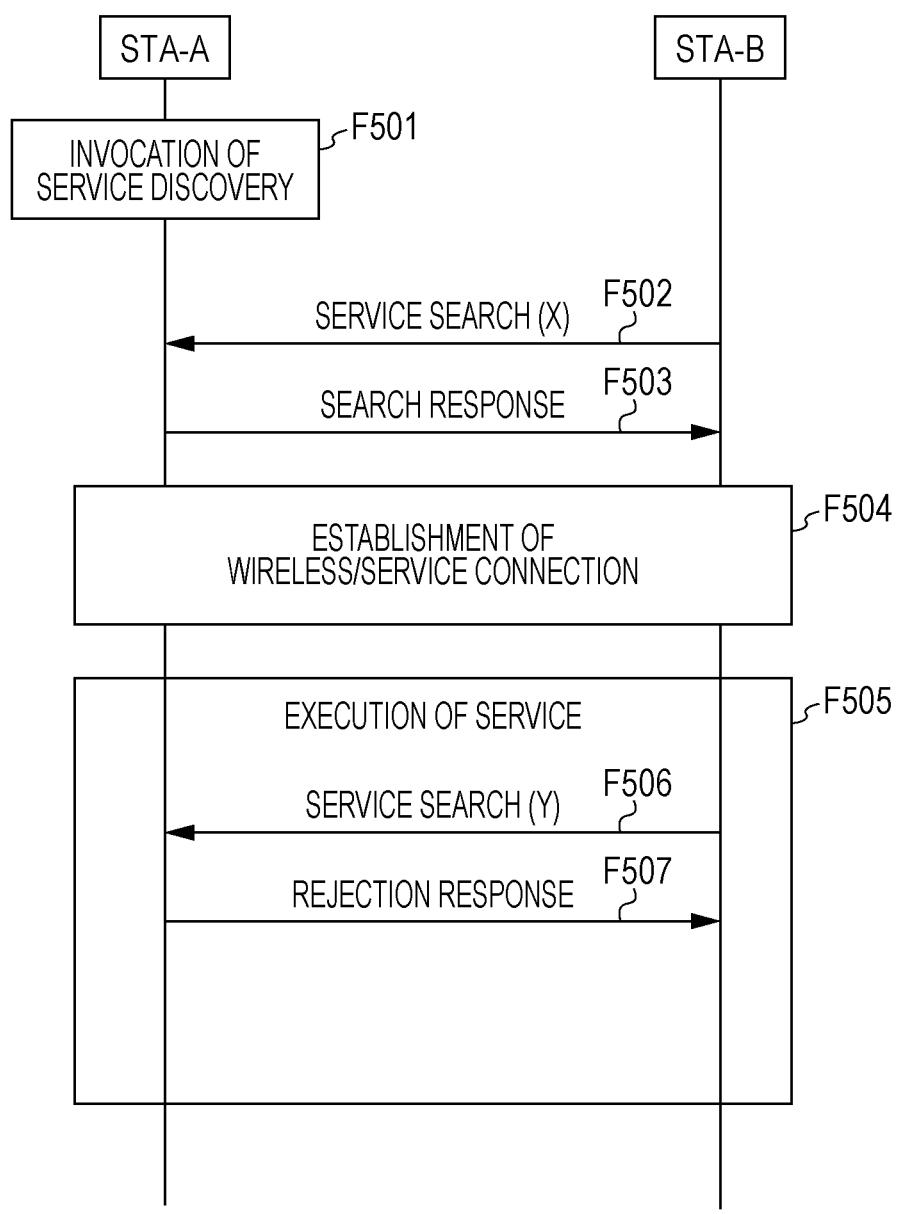
FIG. 5 is an operation sequence diagram according to the first embodiment.

FIG. 5 is a diagram illustrating an operation sequence between apparatuses. An example in which the STA-B as a service using apparatus searches for a service and in which the STA-A as a service providing apparatus offers the service will be described.

In FIG. 5, an example in which the service providing apparatus starts provision of a service X for the service using apparatus and in which a service search for a service Y is performed during execution of the service X will be described. The service X is set as a service which is incapable of operating simultaneously with (or in parallel with) the service Y.

A communication apparatus (in this example, the STA-A) starts the service discovery function for the service X and the service Y (F501). The STA-A serves as a service providing apparatus, and waits for a service search signal from a service using apparatus.

The STA-B starts searching for the service X in response to a user instruction, and transmits a service search signal (F502). The STA-A, which supports the service X, checks that no services are being executed, and transmits a service search response to the STA-B (F503).

The STA-A and the STA-B establish wireless/service connection (F504). The wireless connection uses a connection scheme defined in the Wi-Fi Direct specification described above. In the service connection, logical connection is established between the service layers to allow a service to be offered. These processes may be different depending on a service that is to be offered.

Upon completion of establishment of the connection, the service X is ready to be executed, and enters an execution state (F505). Specifically, in the case where the STA-A is a printer and the STA-B is a digital camera, when a photographed image is to be printed, a printer having a print function is searched for, and printing is performed via wireless connection.

When a user issues an instruction to start the service Y, by using the STA-B, a search request is transmitted (F506). Since the STA-A is already executing the service X, the STA-A transmits a rejection response to the search request (F507). A detailed error code may be added to the rejection response. In this example, a notification of an error caused by "another service which is operating" is transmitted.

Needless to say, in the case where the service X is allowed to operate simultaneously with (or in parallel with) the service Y, a normal response, not an error response, is transmitted.

When the STA-B receives a rejection response, the STA-B displays an error on the display unit. When the STA-B receives an error response to which an error code is added, the STA-B may display a more detailed error reason, or may prompt a user to wait for a predetermined time period. By presenting these pieces of information to a user, it is possible for the user to be prompted to follow a procedure for error recovery.

The example in which the same apparatus searches for the service X and the service Y is described. However, the present invention may be applied to a service search in which different apparatuses search for respective services.

As described above, the first embodiment allows detection of a state in which a service cannot be offered, in the service search stage, enabling the time until an error notification to be shortened. Adding detailed error information allows a procedure for error recovery or the like to be presented to a user, improving the user convenience.

Second Embodiment

In a second embodiment, an example in which another higher-layer application instructs a communication apparatus to perform service discovery of the service Y, during execution of the service X will be described. The service discovery means either or all of a process of searching for a service, a process of advertising service information stored in a communication apparatus, and a process of responding to a service search.

The configurations of apparatuses are similar to that according to the first embodiment which is illustrated in FIGS. 1 and 2. A communication apparatus according to the second embodiment also operates as a service providing apparatus and a service using apparatus according to the first embodiment.

Figure 6:
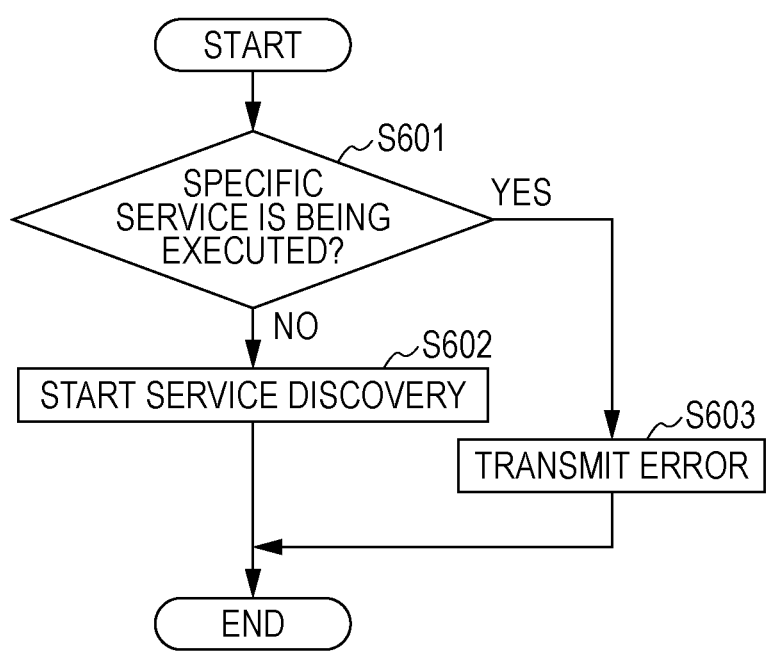
FIG. 6 is a flowchart of operations of an apparatus according to a second embodiment.

FIG. 6 is a flowchart of operations performed when a higher-layer application instructs the Wi-Fi Direct controller 203 of a communication apparatus to invoke service discovery. An operation flow of the communication apparatus will be described by using the flowchart.

When a higher-layer application requests service discovery of the service Y, the service determination unit 209 determines whether or not a specific service X is being executed in the communication apparatus (S601). The higher-layer application is an application operating at a layer (in the description, the application layer) higher than the radio layer.

The specific service X is set as a service which is incapable of operating simultaneously with (or in parallel with) the service Y for which the higher-layer application has issued an instruction to start service discovery. A specific service may be set in advance, or may be dynamically set from operations which were performed. Some apparatuses may have no services which are capable of operating simultaneously with (or in parallel with) the requested service. In this case, the service determination unit 209 may determine whether or not a service is already being executed.

If the specific service X is being executed, the service discovery controller 204 does not start the service discovery function, and notifies the higher-layer application of an error (S603).

If the specific service X is not being executed, the service discovery controller 204 starts the service discovery function (S602). Only when the specific service X is being provide or is being used, an error may occur. For example, an error may occur when service provision of the service Y is requested during provision of the service X, while an error does not occur when service utilization of the service Y is requested during provision of the service X. These may be changed as preset information, or may be dynamically changed. Specifically, for example, a first communication apparatus cannot provide a print output process while displaying a video in response to a video streaming request from a second communication apparatus. In contrast, the first communication apparatus can request the second communication apparatus to perform printing. Another example is that a file transfer service to a second communication apparatus is prohibited during execution of file transfer to a first communication apparatus, while a process of, for example, accepting file transfer from the second communication apparatus may be performed. Thus, while the file transfer side is differentiated from the file-transfer receiving side, a service which is capable of operating simultaneously with (or in parallel with) another service and a service which is incapable of operating simultaneously with (or in parallel with) another service may be set.

In a file transfer service, for example, transfer of an image file and transfer of a document file are differentiated from each other, and a service which is capable of operating simultaneously with (or in parallel with) another service and a service which is incapable of operating simultaneously with (or in parallel with) another service may be set. It is not intended that the examples described herein limit the present invention. Needless to say, they are merely examples for deepening understanding.

Figure 7:
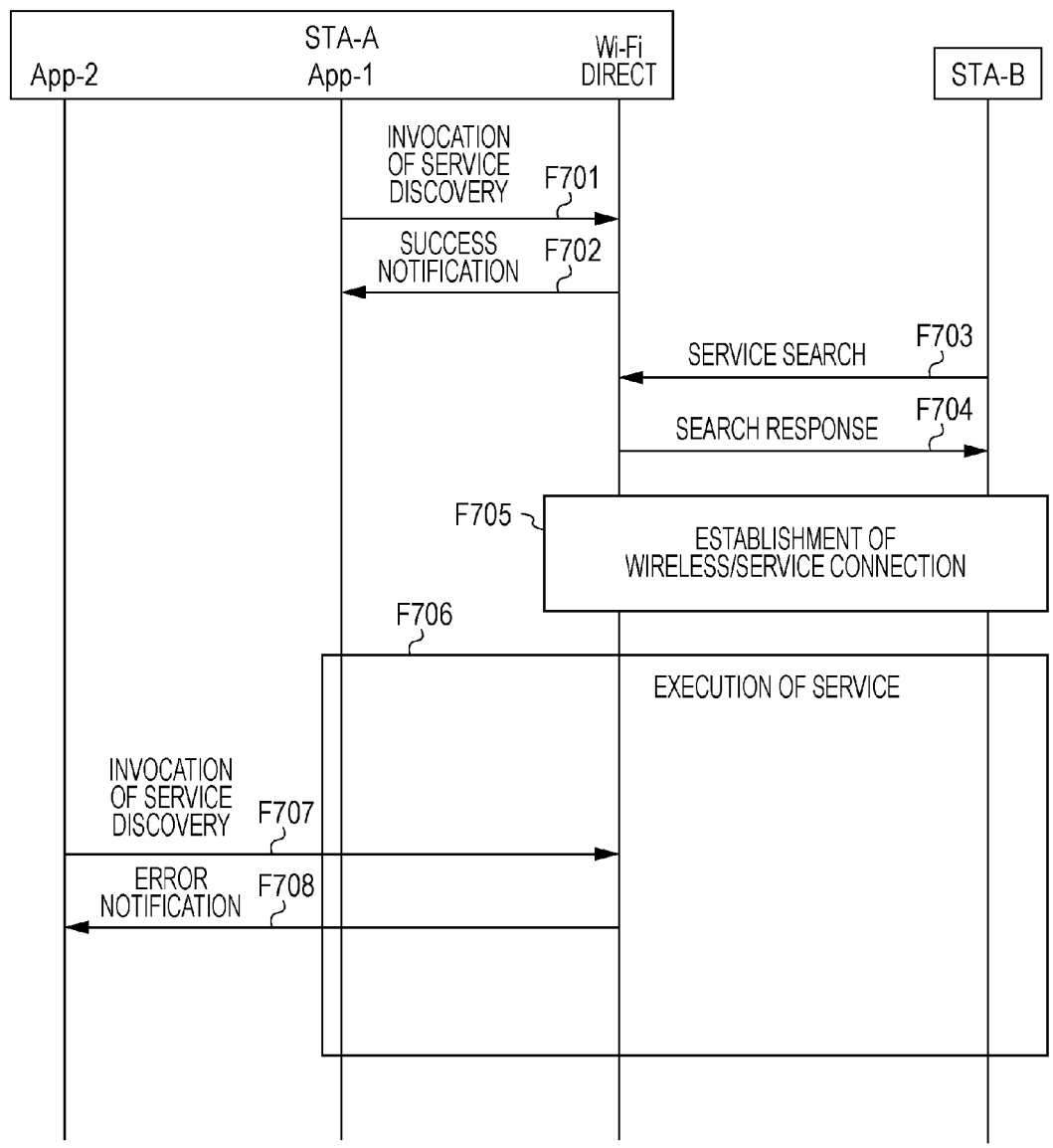
FIG. 7 is an operation sequence diagram according to the second embodiment.

FIG. 7 is a schematic diagram illustrating an operation sequence between apparatuses. An example operation which may be performed in communication between the communication apparatuses as illustrated in FIG. 6 will be described by using FIG. 7. An example in which an application 2 (App-2) which runs on the STA-A invokes service discovery of the service Y while an application 1 (App-1) which runs on the STA-A is executing the service X will be described.

The App-1 instructs the Wi-Fi Direct controller 203 to invoke service discovery of the service X (F701). The Wi-Fi Direct controller 203 starts service discovery, and notifies the App-1 of success in invocation (F702). This process enables the STA-A to response to a service search for the service X from other communication apparatuses. F703 to F706 are similar to F502 to F505, and will not be described.

In the state in which the service X is being executed, the App-2 of the STA-A instructs the Wi-Fi Direct controller 203 to invoke service discovery of the service Y (F707). The service determination unit 209 notifies the Wi-Fi Direct controller 203 of the determination that the service X is already being executed.

The Wi-Fi Direct controller 203 determines that the service X is already being executed. The Wi-Fi Direct controller 203 does not start the discovery function, and notifies the App-2 of an error (F708). This error notification includes either or all of a notification of information indicating that the discovery function cannot be started, a notification of information indicating that another service is already being executed, and a notification of information indicating a service which is already being executed.

This process allows prohibition of advertisement of the service Y that is prohibited from operating simultaneously with (or in parallel with) the service X while the service X is being executed.

Other than that, before the service X and the service Y are invoked, the communication apparatus advertises all pieces of service information including service information about the service X and service Y, and advertises the capability of the communication apparatus to execute both of the services, to other communication apparatuses. In addition, when a process for the service X starts, the communication apparatus may stop advertisement of service information of the service Y that is prohibited from operating simultaneously with (or in parallel with) the service X.

In FIG. 7, the example of advertising service information or responding to a service search is described. Though description using a figure is skipped, the service search process follows a similar operation sequence, as described by using the flowchart in FIG. 6.

As described above, according to the second embodiment, a state in which a service cannot be provided or used can be detected in the stage in which service discovery is invoked, enabling the time until error notification to be shortened.

The present invention can be embodied by using computer programs. A recording medium in which software program codes for achieving the above-described functions are recorded may be supplied to a system or an apparatus. A computer, i.e., a central processing unit (CPU) or a micro processing unit (MPU), of the system or the apparatus may read out and execute the program codes stored in the recording medium. In this case, the program codes themselves which are read out from the recording medium achieve the functions in the above-described embodiments, and the recording medium storing the program codes is included in the present invention.

As a recording medium for supplying program codes, for example, a flexible disk, a hard disk, an optical disk, a magneto-optical disk, a compact disk-read-only memory (CD-ROM), a CD recordable (CD-R), a magnetic tape, a nonvolatile memory card, a read-only memory (ROM), or a digital versatile disk (DVD) may be used.

By executing program codes which are read out by a computer, the above-described functions are achieved. In addition, the operating system (OS) running on the computer may perform some or all of actual processes on the basis of the instructions of the program codes so as to achieve the above-described functions.

The program codes which are read out from the recording medium are written in a memory included in a function expansion board inserted into the computer or in a function expansion unit connected to the computer. A CPU included in the function expansion board or the function expansion unit may perform some or all of the actual processes on the basis of the instructions of the program codes, so as to achieve the above-described functions.

The present invention allows other apparatuses to be prevented from being notified of a service having limitation, in spite of limitation imposed on the service operation.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a CPU, MPU, or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a CD, DVD, or Blu-ray Disc (BD) (trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more memories that store instructions; and
one or more processors that execute the instructions to:
receive a search signal from another communication apparatus that is not wirelessly connected;
detect an execution state of a predetermined service;
transmit response signals to the search signal in a case where the predetermined service is not being executed, and transmit no response signals to the search signal in a case where the predetermined service is being executed; and
perform wireless connection processing for connection to said another communication apparatus in a case where the response signals are transmitted and not perform wireless connection processing for connection to said another communication apparatus in a case where the response signals are not transmitted.

2. The communication apparatus according to claim 1, wherein the communication apparatus determines an apparatus that is to be a base station between the communication apparatus and said another communication apparatus, and establishes connection to said another communication apparatus.

3. The communication apparatus according to claim 2, wherein, before connection to said another communication apparatus is established, the communication apparatus transmits a signal indicating a notification that the communication apparatus is ready to execute the service specified in the search signal transmitted from said another communication apparatus, in response to the search signal.

4. The communication apparatus according to claim 2, wherein, after the connection to said another communication apparatus is established, the communication apparatus transmits a signal indicating a notification that the communication apparatus is ready to execute the service specified in the search signal transmitted from said another communication apparatus, in response to the search signal.

5. The communication apparatus according to claim 1, wherein the predetermined service contains a service that is incapable of operating in parallel with a service specified by the search signal.

6. The communication apparatus according to claim 1, wherein, in the case where the communication apparatus does not support a service specified by the search signal, the communication apparatus does not transmit a response signal in response to the search signal or transmits a signal indicating that it is impossible to provide the service in response to the search signal.

7. The communication apparatus according to claim 1, wherein the communication apparatus transmits a signal indicating a notification that the communication apparatus is ready to provide a service specified by the search signal in the case where the communication apparatus supports the service specified by the search signal and where the predetermined service is not being executed.

8. The communication apparatus according to claim 1, wherein the predetermined service contains a print service.

9. The communication apparatus according to claim 1, wherein the predetermined service contains a movie streaming service.

10. The communication apparatus according to claim 1, wherein the predetermined service contains a file transfer service.

11. The communication apparatus according to claim 1, wherein the communication apparatus is a wireless communication apparatus.

12. The communication apparatus according to claim 1, wherein the communication apparatus performs wireless communication based on the IEEE 802.11 standard.

13. A method for controlling a communication apparatus, comprising:
  receiving a search signal from another communication apparatus that is not wirelessly connected;
  detecting an execution state of a predetermined service;
  transmitting response signals to the search signal in a case where the predetermined service is not being executed, and transmitting no response signals in a case where the predetermined service is being executed; and
  performing wireless connection processing for connection to said another communication apparatus in a case where the response signals are transmitted and not performing wireless connection processing for connection to said another communication apparatus in a case where the response signals are not transmitted.

14. A non-transitory computer-readable storage medium storing a program to cause a computer to execute a method comprising:
  receiving a search signal from another communication apparatus that is not wirelessly connected;
  detecting an execution state of a predetermined service;
  transmitting response signals to the search signal in a case where the predetermined service is not being executed, and transmitting no response signals to the search signal in a case where the predetermined service is being executed; and
  performing wireless connection processing for connection to said another communication apparatus in a case where the response signals are transmitted and not performing wireless connection processing for connection to said another communication apparatus in a case where the response signals are not transmitted.

* * * * *